(12) United States Patent
Jones et al.

(10) Patent No.: US 9,230,145 B2
(45) Date of Patent: Jan. 5, 2016

(54) APPARATUS AND METHOD PERTAINING TO CONVEYING INFORMATION VIA AN RFID TRANSCEIVER

(71) Applicant: Wal-Mart Stores, Inc., Bentonville, AR (US)

(72) Inventors: Nicholaus A. Jones, Fayetteville, AR (US); Bruce W. Wilkinson, Rogers, AR (US); Abu Rasel, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 287 days.

(21) Appl. No.: 13/870,647

(22) Filed: Apr. 25, 2013

(65) Prior Publication Data

US 2014/0320269 A1    Oct. 30, 2014

(51) Int. Cl.
*H04Q 5/22* (2006.01)
*G06K 7/10* (2006.01)
*G06Q 10/06* (2012.01)

(52) U.S. Cl.
CPC ...... *G06K 7/10297* (2013.01); *G06Q 10/06316* (2013.01)

(58) Field of Classification Search
CPC .................. G06K 7/10297; G06Q 10/06316
See application file for complete search history.

(56) References Cited

U.S. PATENT DOCUMENTS

| | | | |
|---|---|---|---|
| 5,376,778 A | 12/1994 | Kreft | |
| 6,641,036 B1 | 11/2003 | Kalinowski | |
| 6,680,675 B1 * | 1/2004 | Suzuki | 340/988 |
| 6,894,660 B2 | 5/2005 | Sanogo | |
| 6,946,951 B2 | 9/2005 | Cole | |
| 6,992,567 B2 | 1/2006 | Cole | |
| 7,170,415 B2 | 1/2007 | Forster | |

(Continued)

FOREIGN PATENT DOCUMENTS

| | | |
|---|---|---|
| CN | 101021894 | 8/2007 |
| CN | 101076644 | 11/2007 |

(Continued)

OTHER PUBLICATIONS

U.S. Appl. No. 13/871,572, filed Apr. 26, 2013, Jones
(Continued)

*Primary Examiner* — Steven Lim
*Assistant Examiner* — Omeed Alizada
(74) *Attorney, Agent, or Firm* — Fitch, Even, Tabin & Flannery LLP

(57) ABSTRACT

An RFID transceiver and RFID-tag reader cooperate to convey information from one to the other and further accommodate the RFID-tag reader transmitting information to the RFID transceiver that causes a modification of information presented via the RFID transceiver. By one approach an RFID-tag reader detects a circumstance that evidences a particular status as pertains to a particular item of such information in a given RFID transceivers. An RFID-tag reader can then serve to modify the information at the corresponding RFID transceiver. By one approach, the aforementioned information comprises a to-do list. The aforementioned modification can comprise modifying at least one to-do item in that to-do list. The aforementioned detection of a circumstance can comprise detecting a physical location of the given RFID transceiver. That location information can be compared to locations that correspond to specific to-do items in the list to identify correlations that evidence completion of specific to-do items.

3 Claims, 3 Drawing Sheets

(56) References Cited

U.S. PATENT DOCUMENTS

| | | |
|---|---|---|
| 7,187,267 B2 | 3/2007 | Cole |
| 7,187,288 B2 | 3/2007 | Mendolia |
| 7,205,896 B2 | 4/2007 | Wu |
| 7,221,259 B2 | 5/2007 | Cole |
| 7,432,817 B2 | 10/2008 | Phipps |
| 7,528,726 B2 | 5/2009 | Lee |
| 7,633,394 B2 | 12/2009 | Forster |
| 7,642,916 B2 | 1/2010 | Phipps |
| 7,642,917 B2 | 1/2010 | Tran |
| 7,762,472 B2 | 7/2010 | Kato |
| 7,800,497 B2 | 9/2010 | Marusak |
| 7,812,729 B2 | 10/2010 | Copeland |
| 7,823,269 B2 | 11/2010 | Martin |
| 7,880,620 B2 | 2/2011 | Hatori |
| 7,973,662 B2 | 7/2011 | Phipps |
| 8,063,779 B2 | 11/2011 | Coveley |
| 8,258,958 B2 | 9/2012 | Kang |
| 8,286,884 B2 | 10/2012 | Wilkinson |
| 8,286,887 B2 | 10/2012 | Wilkinson |
| 8,410,937 B2 | 4/2013 | Collins |
| 8,505,829 B2 | 8/2013 | Wilkinson |
| 8,544,758 B2 | 10/2013 | Wilkinson |
| 8,669,915 B2 | 3/2014 | Wilkinson |
| 2003/0025636 A1 | 2/2003 | Chen |
| 2004/0046643 A1 | 3/2004 | Becker |
| 2006/0145710 A1 | 7/2006 | Puleston |
| 2006/0158311 A1 | 7/2006 | Hall |
| 2007/0096915 A1 | 5/2007 | Forster |
| 2007/0164868 A1 | 7/2007 | Deavours |
| 2007/0290856 A1 | 12/2007 | Martin |
| 2008/0018431 A1 | 1/2008 | Turner |
| 2008/0048834 A1 | 2/2008 | Lenevez |
| 2008/0088459 A1 | 4/2008 | Martin |
| 2008/0094181 A1 | 4/2008 | Lenevez |
| 2008/0116256 A1 | 5/2008 | Martin |
| 2008/0129512 A1 | 6/2008 | Bielas |
| 2008/0129513 A1 | 6/2008 | Bielas |
| 2009/0008460 A1 | 1/2009 | Kato |
| 2009/0015480 A1 | 1/2009 | Shafer |
| 2009/0027208 A1 | 1/2009 | Martin |
| 2009/0066516 A1 | 3/2009 | Lazo |
| 2009/0108993 A1 | 4/2009 | Forster |
| 2009/0206995 A1 | 8/2009 | Forster |
| 2010/0001079 A1 | 1/2010 | Martin |
| 2010/0045025 A1 | 2/2010 | Cote |
| 2010/0060425 A1 | 3/2010 | Rodriguez |
| 2010/0079245 A1 | 4/2010 | Perng |
| 2010/0079287 A1 | 4/2010 | Forster |
| 2010/0230500 A1 | 9/2010 | Wilkinson |
| 2011/0012713 A1 | 1/2011 | Wilkinson |
| 2011/0063113 A1 | 3/2011 | Hook |
| 2011/0298591 A1 | 12/2011 | Mickle |
| 2012/0013440 A1 | 1/2012 | vonBose |
| 2012/0013441 A1 | 1/2012 | Ulrich |
| 2012/0086553 A1 | 4/2012 | Wilkinson |
| 2012/0155349 A1 | 6/2012 | Bajic |
| 2012/0217307 A1 | 8/2012 | Martin |
| 2012/0274449 A1 | 11/2012 | Wilkinson |
| 2013/0040570 A1 | 2/2013 | Wilkinson |
| 2013/0043308 A1 | 2/2013 | Wilkinson |
| 2013/0206846 A1 | 8/2013 | Wilkinson |
| 2013/0299583 A1 | 11/2013 | Wilkinson |
| 2014/0266632 A1 | 9/2014 | Jones |
| 2014/0279294 A1* | 9/2014 | Field-Darragh et al. ........ 705/28 |

FOREIGN PATENT DOCUMENTS

| | | |
|---|---|---|
| GB | 2481156 | 12/2011 |
| JP | 2004046904 A | 2/2004 |
| JP | 2008158569 A | 7/2008 |
| JP | 2008162120 | 7/2008 |
| JP | 2009049763 | 3/2009 |
| KR | 200412323 Y1 | 3/2006 |
| KR | 20070026388 A | 3/2007 |
| WO | 2005073937 A2 | 8/2005 |
| WO | 2010104991 A2 | 9/2010 |

OTHER PUBLICATIONS

U.S. Appl. No. 14/092,461, filed Nov. 27, 2013, Jones.
EPCGLOBAL; 'EPC(TM) Radio-Frequency Identity Protocols Class-1 Generation-2 UHF RFID Protocol for Communications at 860 MHz-960 MHz Version 1.0.9;' Specification for RFID Air Interface by EPCglobal Inc.; 94 pages, Jan. 2005.
Nikitin et al.; An Overview of Near Field UHF RFID; Feb. 2007; 8 pages; IEEE.
RFIDSOUP.com; RFID Soup; Mar. 6, 2009; 12 pages; published at http://rfidsoup.pbwiki.com.
Swedberg, Claire; RFID Puts Salt Lake City Drivers in the Fast Lane; RFID Journal; Oct. 1, 2010; 5 pages; published at http://www.rfidjournal.com/article/view/7907.
Tagsense.com, TagSene Frequently Asked Questions; Mar. 6, 2009; 3 pages; published at www.tagsense.com/ingles/faq/faq.html.
Tagsys; AK Product Datasheet; Dec. 19, 2012; 1 page; published at www.tagsysrfid.com/products-services/rfid-tags/ak.
Tagsys; AK Product Datasheet; Feb. 14, 2010; 1 page; published at webarchive.org/web/20100214004043/http://www.tagsysrfid.com/products-services/rfid-tags/ak.
Tagsys; AK5 Converted Product Specification; Oct. 2012; 2 pages; published at www.tagsysrfid.com.
Tagsys; AKTag UHF Tag Datasheet; Nov. 23, 2012; 2 pages; published at www.tagsysrfid.com.
Tagsys; UHF AK Tag; Sep. 2008; 2 pages; published at www.tagsysrfid.com.
Technovelgy.com; Passive RFID Tag (or Passive Tag); Mar. 5, 2009; 5 pages; published at www.technovelgy.com.
Wikipedia; RFID; Mar. 6, 2009; 2 pages; published at http://rfidsoup.pbwiki.com.

\* cited by examiner

APPARATUS AND METHOD PERTAINING TO CONVEYING INFORMATION VIA AN RFID TRANSCEIVER

RELATED APPLICATION(S)

This application is related to co-pending and co-owned U.S. patent application Ser. No. 13/804,393, entitled METHOD AND APPARATUS PERTAINING TO RFID TAG-BASED USER ASSERTIONS and filed Mar. 14, 2013, which is incorporated by reference in its entirety herein.

TECHNICAL FIELD

This invention relates generally to radio-frequency identification (RFID) transceivers.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

There are proposals to utilize RFID tags to individually identify individual items. The Electronic Product Code (EPC) as managed by EPCGlobal, Inc. represents one such effort in these regards. EPC-based RFID tags each have a unique serial number to thereby uniquely identify each tag and, by association, each item correlated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 is hereby fully incorporated herein by this reference.)

In addition to reading part or all of the informational contents of an RFID tag, an RFID-tag reader can also serve to convey information to an RFID tag.

BRIEF DESCRIPTION OF THE DRAWINGS

Disclosed herein is an apparatus and method pertaining to conveying information via an RFID transceiver. This description includes drawings, wherein.

Figure 1:
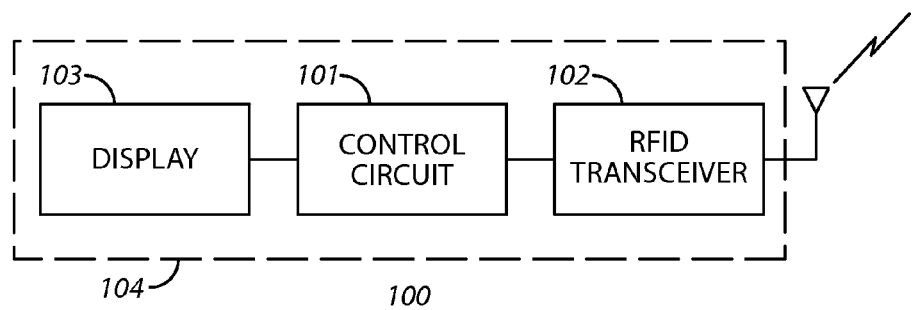
FIG. 1 comprises a block diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, an RFID transceiver and RFID-tag reader cooperate to convey information from one to the other. In particular, these teachings accommodate the RFID-tag reader transmitting information to the RFID transceiver that causes a modification of information presented via the RFID transceiver. By one approach an RFID-tag reader detects a circumstance that evidences a particular status as pertains to a particular item of such information in a given RFID transceiver. In such a case these teachings will accommodate using such an RFID-tag reader to modify the information at the corresponding RFID transceiver.

By one approach, and by way of a non-limiting example, the aforementioned information comprises a to-do list. In this case the aforementioned modification can comprise modifying at least one to-do item in that to-do list. By one approach the aforementioned detection of a circumstance that evidences a particular status as pertains to a particular item of information comprises, at least in part, detecting a physical location of the given RFID transceiver. By way of further example, that physical location information can be compared to physical locations that correspond to specific to-do items in the to-do list to identify correlations of interest that evidence, for example, attention to and/or completion of specific to-do items.

So configured, and by way of example, associates for a given enterprise can be provided with extremely inexpensive devices that compatibly interact with the enterprise's RFID-tag reader infrastructure to receive and display, for example, individualized task assignments. More particularly, the device and the RFID-tag reader infrastructure can cooperate with one another in a manner that permits dynamic and automatic management of those task assignments. For example, completed to-do items can in many cases be automatically marked as being completed or can otherwise automatically be removed from the displayed list of to-do items.

By one approach, these teachings facilitate this dynamic management of task assignments without a need for direct user input to the device itself. Accordingly, the cost and complexity of the device can be reduced further by avoiding a need for buttons, switches, touch-sensitive displays, voice recognition, or the like. These teachings are also highly scalable and will accommodate a wide variety of application settings, information types and volume, and end user device configurations.

These and other benefits may become clearer upon making a thorough review and study of the following detailed description. Referring now to the drawings, and in particular to FIG. 1, a first apparatus 100 configured in accordance with these teachings includes a control circuit 101 that operably couples to an RFID transceiver 102 and a display 103. Such an apparatus 100 can be sized and have a form factor appropriate to permit the apparatus 100 to be easily carried and/or worn by an average person of either gender (for example, in a pocket or in a holster, on a lanyard that is disposed around the user's neck, as a wristwatch-styled device, and so forth). If desired, such an apparatus 100 can have other components (such as a portable power supply, one or more user-input interfaces, and so forth). For the sake of clarity and a simple example, however, such additional components are not shown here.

The RFID transceiver 102 is configured to receive information from an RFID reader and to transmit at least a unique identifier (such as a unique EPC value) to the RFID reader. The present teachings will accommodate a wide range of practices in these regards. For many application settings, however, it will suffice if the RFID transceiver 102 comprises an EPC GEN2-compliant RFID-tag transceiver of which many are well known and understood in the art.

The display 103 can comprise, for example, any of a variety of flat-screen display technologies and/or flexible-screen display technologies as desired. By one approach the display 103 comprises an electronic paper display (such as, but not limited to, an electrophoretic ink display as is known in the art).

The control circuit 101 can comprise a fixed-purpose hardwired platform or can comprise a partially or wholly programmable platform. These architectural options are well known and understood in the art and require no further description here. This control circuit 101 is configured (for example, by using corresponding programming as will be well understood by those skilled in the art) to carry out one or more of the steps, actions, and/or functions described herein. In particular, the control circuit 101 is configured to present via the display 103 at least some of the information from the RFID reader (as received via the RFID transceiver 102). The control circuit 101 is also configured to modify at least some of the presented information in response to other items of information from the RFID reader.

As will be described below in more detail, the aforementioned information from the RFID reader can comprise, at least in part, a to-do list and hence the control circuit 101 can serve, in part, to display at least a part of that to-do list on the display 103. In such a case, the aforementioned modifications can comprise modifying the to-do list as a function, at least in part, of other information from the RFID reader.

Figure 2:
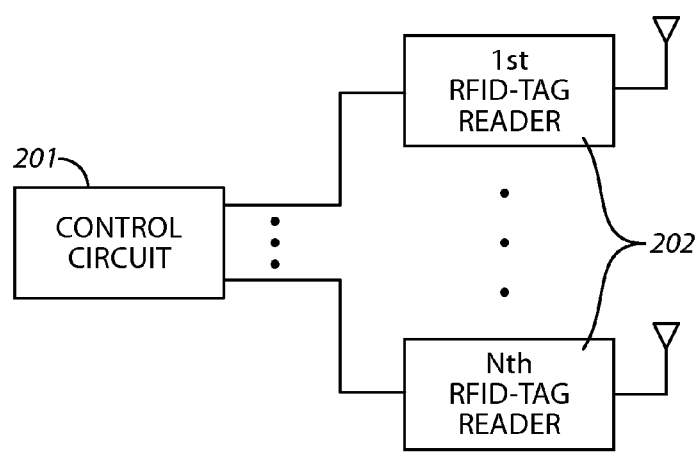
FIG. 2 comprises a block diagram as configured in accordance with various embodiments of the invention.

FIG. 2 presents a depiction of an RFID-reader system having a control circuit 201 that operably couples to a plurality of RFID-tag readers 202. There can be any number of RFID-tag readers 202 as exemplified here by a first through an Nth RFID-tag reader 202 (where "N" will be understood to comprise an integer). By one approach these RFID-tag readers 202 comprise, at least in part, overhead RFID-tag readers that hang suspended from the ceiling of the corresponding facility (not shown). Examples in such regards can be found, for example, in U.S. patent application Ser. No. 12/900,191, entitled METHOD AND APPARATUS PERTAINING TO RFID TAG READER ANTENNA ARRAY (the contents of which are fully incorporated herein by this reference). That said, the present teachings can be employed and leveraged in other application settings as well.

Figure 3:
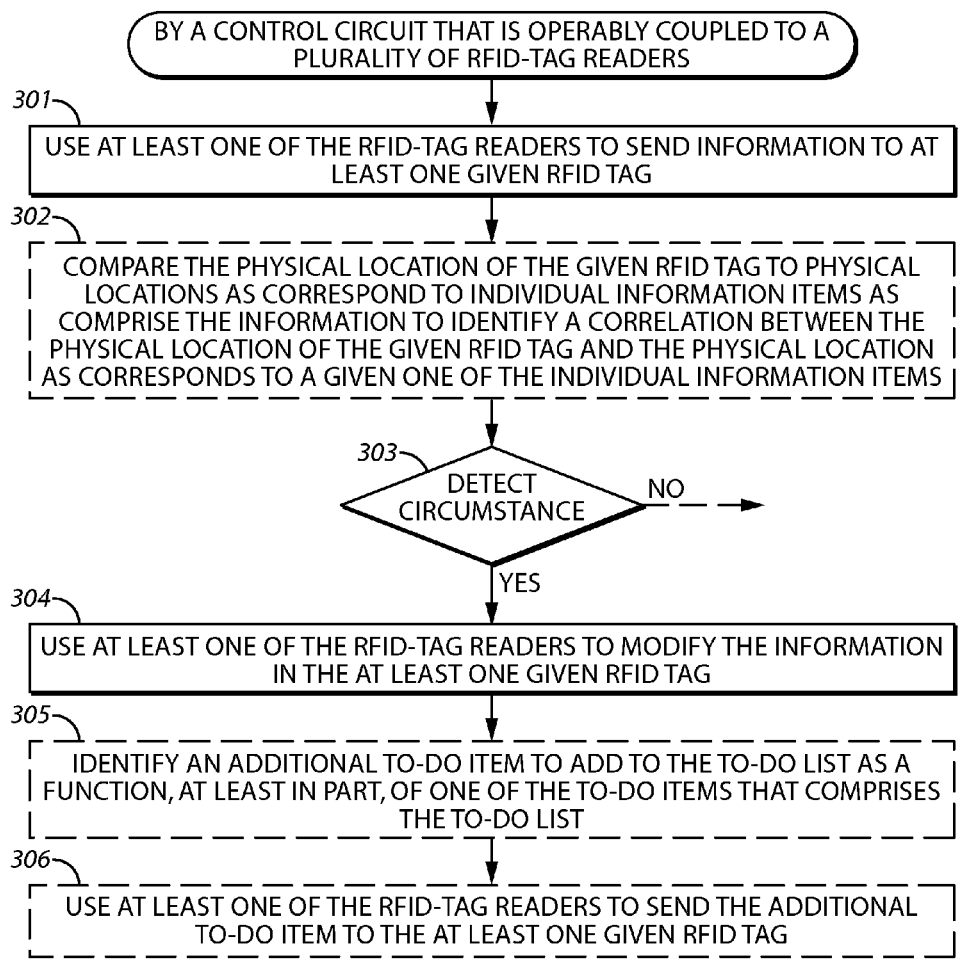
FIG. 3 comprises a flow diagram as configured in accordance with various embodiments of the invention.

This system control circuit 201 is configured to carry out various activities in support of the present teachings By one approach, for example, this control circuit 201 is configured (via, for example, appropriate programming) to carry out the process 300 shown in FIG. 3.

At 301 the control circuit 201 uses at least one of the RFID-tag readers 202 to send information to at least one apparatus 100 as described above. For the sake of a simple, illustrative example, the remainder of this description shall presume to refer to the receiving apparatus 100 as an RFID tag. Transmitting information, such as text, from an RFID-tag reader to an RFID tag comprises a well-understood area of endeavor. Accordingly, for the sake of brevity further details in these regards are not provided here.

Figure 4:
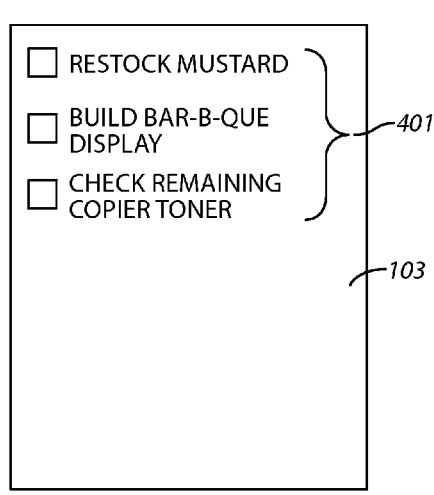
FIG. 4 comprises a screen shot as configured in accordance with various embodiments of the invention.

By one approach this information comprises, at least in part, a to-do list (i.e., a list of errands, chores, or tasks that are assigned or otherwise undertaken to be accomplished, typically within some corresponding specified or understood time frame). As noted above, the receiving apparatus 100 is configured to present such received information on its display 103. FIG. 4 presents an illustrative example of such a to-do list 401 as shown on such a display 103. In this example each to-do item comprises a brief textual task description along with an empty checkbox to denote the corresponding to-do item as being not-yet accomplished.

So configured, the to-do items can be uniquely targeted to specific receiving RFID tags (by using and leveraging, for example, the unique EPC value assigned to each such RFID tag in this example) and hence to specific individuals who are assigned, temporarily or permanently, to such tags. In this way, if desired, each associate at a given facility (such as a retail store) can be provided with a personal-to-them to-do list of tasks that are specific to their shift, location, rank, status, training, or the like.

By one optional approach, at 302 the control circuit 201 compares the physical location of the given RFID tag to physical locations as correspond to individual information items as comprise the information. This can comprise, for example, comparing the physical location of a given RFID tag to physical locations as correspond to individual to-do items on the aforementioned to-do list. There are various known ways by which the physical location of a given RFID tag can be ascertained (using, for example, radio frequency-based triangulation); accordingly, further details in those regards are not provided here.

The control circuit 201 then identifies correlations between the RFID tag's physical location and the physical locations that correspond to the given individual information items. For example, as shown in FIG. 4, the to-do item "RESTOCK MUSTARD" can have a corresponding physical location within a retail facility; i.e., a particular aisle and a particular part of that aisle where mustard is ordinarily stocked and displayed. In such a case, this step 302 can comprise identifying when the RFID tag's physical location is the same as the physical location for where mustard is ordinarily stocked and displayed.

At 303 the control circuit 201 seeks to detect one or more circumstances of interest. For example, the control circuit 201 can detect when a circumstance that evidences a particular status as pertains to a particular item in the information arises (and, if desires, persists for at least some predetermined period of time). By one approach this can comprise detecting that the RFID tag is at the location where mustard is stocked and displayed. These teachings will also support the detection of a series of circumstances that together evidence the status of interest. For example, this process 300 will permit first detecting that the RFID tag is physically proximal to an area in a back store room where mustard is stored and then detecting that the RFID tag is next moved to the aisle and area where mustard if displayed and/or that the RFID tag has remained in the aforementioned area for at least a predetermined amount of time that corresponds to a restocking behavior. These events and observations, in sequence, can together constitute evidence that the status of the to-do item "RESTOCK MUSTARD" is "COMPLETED."

Figure 5:
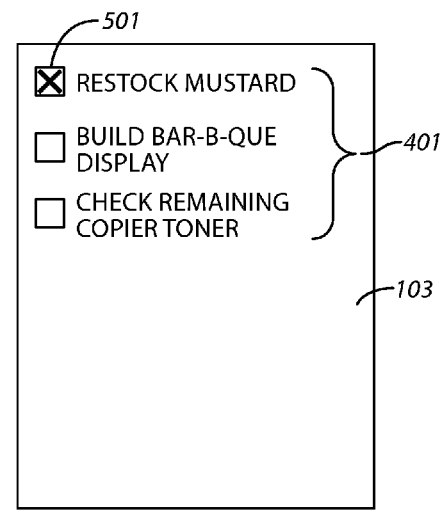
FIG. 5 comprises a screen shot as configured in accordance with various embodiments of the invention.

Upon detecting such a circumstance, at 304 the control circuit 201 then uses at least one of the plurality of RFID-tag readers 202 to modify the information in the given RFID tag. When the foregoing information comprises a to-do list as described above, this modification can comprise, by one approach, modifying at least one to-do item in the to-do list. As exemplified in FIG. 5, by one approach such a modification can comprise, if desired, modifying the corresponding to-do item(s) to indicate completion of the to-do item. As illustrated, this can comprise placing a marker 501 in the checkbox for the RESTOCK MUSTARD to-do item. As another example (not illustrated), an overstrike line could be placed over part or all of the text portion of the to-do item.

These teachings will accommodate a variety of approaches in these regards. For example, background shading could serve in these same regards. It would also be possible to change the specifics of the displayed font to indicate completion of the to-do item (by, for example, changing the color or grayscale value of the font, changing the font from a bold font to an ordinary font, by italicizing the font, and so forth).

Figure 6:
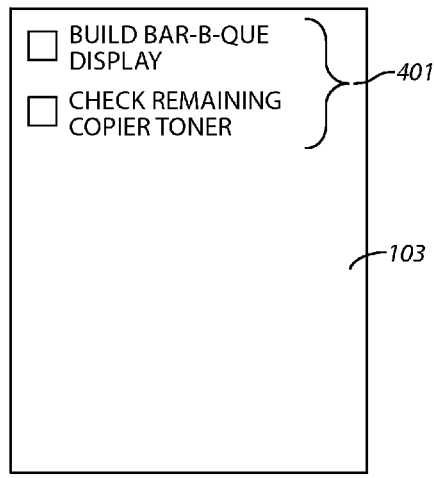
FIG. 6 comprises a screen shot as configured in accordance with various embodiments of the invention.

In lieu of the foregoing and as illustrated in FIG. 6 these teachings will also accommodate modifying the completed to-do item by simply removing the to-do item from the presented to-do list 401. By yet another approach the to-do item can first be modified as described above to indicate completion and then, after some predetermined period of time (such as ten seconds, one minute, five minutes, or some other duration of interest) the to-do item is then removed from the presented to-do list 401.

So configured, the user apparatus 100 can maintain a to-do list without requiring any specific actions from the user other than attending to the to-do items themselves. By one approach, then, the user apparatus 100 can be completely without any user-input interfaces and might simply comprise (from the standpoint of a user interface) a display that presents the aforementioned to-do list both in an original form and as automatically updated from time to time as described herein. Such a device offers a very economical approach to providing associates with a dynamic, active to-do list to help ensure that associates understand their current responsibilities and to help prompt their attention to those responsibilities.

These teachings are also highly flexible in practice and will accommodate a variety of variations, modifications, and combinations. As one example in these regards, at 305 the control circuit 201 can optionally identify an additional to-do item to add to the to-do list for a specific apparatus 100. By one example, if desired, such an additional to-do item can be identified as a function, at least in part, of one of the other to-do items that comprises the to-do list for a particular apparatus 100. As a simple illustrative example in these regards, a spill may occur in some portion of a retail facility, and a review of present to-do items indicates that a particular associate's to-do list has them working on a task in an area that is relatively near where the spill occurred.

Figure 7:
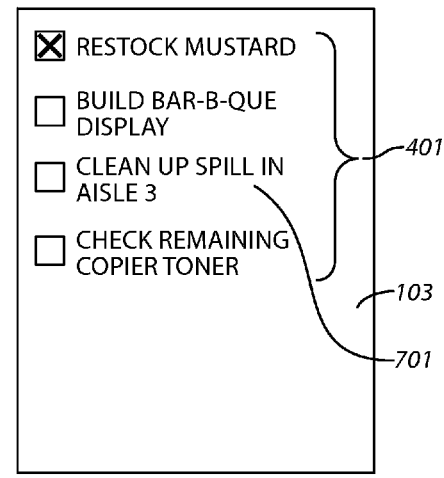
FIG. 7 comprises a screen shot as configured in accordance with various embodiments of the invention.

At 306, then, the control circuit 201 can again use one (or more) of the RFID-tag readers 202 to send the additional to-do item to one or more corresponding RFID tags to thereby supplement the already-supplied to-do lists on those apparatuses 100. As shown in FIG. 7, and by way of an illustrative example, a new to-do item CLEAN UP SPILL IN AISLE 3 (as denoted by reference numeral 701) has been received by the apparatus 100 and is now automatically presented on the display 103 as part of the to-do list 701.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept. As a specific illustrative example in these regards, the apparatus 100 can be configured to sound an audible alert upon receiving a to-do list, upon receiving a modification to an existing to-do item, and/or upon receiving a supplemental to-do item. As another illustrative example these teachings will readily accommodate having the control circuit 201 transmit information to the apparatus 100 to thereby cause the latter to present a to-do list having one or more redacted to-do items even if the corresponding associate did not themselves attend to the redacted to-do items.

What is claimed is:

1. A method comprising:
   by a control circuit that is operably coupled to a plurality of radio-frequency identification (RFID)-tag readers:
      using at least one of the plurality of RFID-tag readers to send to-do list information to at least one given RFID tag;
      detecting, via at least one of the plurality of RFID-tag readers, a physical location for the given RFID tag;
      determining that a particular task in the to-do list information has a physical location that corresponds to the physical location for the given RFID tag for at least a predetermined amount of time;
      automatically updating the to-do list information to indicate completion of the particular task in the at least one given RFID tag.

2. The method of claim 1 further comprising:
   identifying an additional to-do item to add to the to-do list as a function, at least in part, of one of the to-do items that comprises the to-do list;
   using at least one of the plurality of RFID-tag readers to send the additional to-do item to the at least one given RFID tag.

3. An apparatus comprising:
   a control circuit that is operably coupled to a plurality of radio-frequency identification (RFID)-tag readers, the control circuit being configured to:
      use at least one of the plurality of RFID-tag readers to send to-do list information to at least one given RFID tag;
      detect, via at least one of the plurality of RFID-tag readers, a physical location for the given RFID tag;
      determine that a particular task in the to-do list information has a physical location that corresponds to the physical location for the given RFID tag for at least a predetermined amount of time;
      automatically update the to-do list information to indicate completion of the particular task in the at least one given RFID tag.

* * * * *